United States Patent
Liu et al.

(10) Patent No.: US 7,060,356 B2
(45) Date of Patent: Jun. 13, 2006

(54) CARBON NANOTUBE-BASED DEVICE AND METHOD FOR MAKING CARBON NANOTUBE-BASED DEVICE

(75) Inventors: Liang Liu, Beijing (CN); Shoushan Fan, Beijing (CN)

(73) Assignees: Tsinghua Univesity, Beijing (CN); Hon Hai Precision Ind.Co., Ltd., Taipei Hsien (TW)

( * ) Notice: Subject to any disclaimer, the term of this patent is extended or adjusted under 35 U.S.C. 154(b) by 157 days.

(21) Appl. No.: 10/745,251

(22) Filed: Dec. 22, 2003

(65) Prior Publication Data
US 2004/0136896 A1   Jul. 15, 2004

(30) Foreign Application Priority Data
Dec. 21, 2002   (CN) ............................... 02 1 49726

(51) Int. Cl.
*B32B 9/00*   (2006.01)
*H01J 1/02*   (2006.01)

(52) U.S. Cl. .................. 428/408; 423/445 R; 313/311; 264/346

(58) Field of Classification Search ............... 428/408, 428/607, 206; 313/311
See application file for complete search history.

(56) References Cited

U.S. PATENT DOCUMENTS 6,232,706 B1 *   5/2001   Dai et al. .................... 313/309
6,277,318 B1 *   8/2001   Bower et al. ............... 264/346
6,465,132 B1 *  10/2002   Jin ............................ 429/231.8
2002/0055010 A1 *   5/2002   Gao et al. .................... 428/607

OTHER PUBLICATIONS

Langmuir, 17 (2) 260-264, 2001.*
Fan S. S. et al. "Self-oriented Regular of Carbon Nanotubes and Their Emission Properties" Science, Jan. 22, 1999, vol. 283, pp. 512-514.
B. Q. Wei et al. "Organized Assembly of Carbon nanotubes" Nature Apr. 4, 2002, vol. 416, pp. 495-496.
Yue-gang Zhang et al. "Electric-field-directed Growth of Aligned Single-walled carbon nanotubes" Applied Physics Letters, Nov. 5, 2001, vol. 79, No. 19.

* cited by examiner

*Primary Examiner*—Jennifer McNeil
*Assistant Examiner*—Daniel Miller
(74) *Attorney, Agent, or Firm*—Wei Te Chung

(57) ABSTRACT

A carbon nanotube-based device (40) includes a substrate (10), a number of alloyed, nano-sized catalytic particles (26) formed on the substrate, and an array of aligned carbon nanotubes (15) extending from the alloyed, nano-sized catalytic particles. The nanotube array bends in an arcuate configuration. A method for making the carbon nanotube-based device includes the steps of: providing a substrate; depositing a catalyst layer on the substrate; depositing two different layers of catalyst-doped materials on different areas of the catalyst layer for accelerating or decelerating the rate of synthesis of the aligned carbon nanotube array; annealing the catalyst and the catalyst-doped materials in an oxygen-containing gas at a low temperature; introducing a carbon source gas; and forming an array of aligned carbon nanotubes extending from the alloyed, nano-sized catalytic particles using a chemical vapor deposition method.

7 Claims, 4 Drawing Sheets

CARBON NANOTUBE-BASED DEVICE AND METHOD FOR MAKING CARBON NANOTUBE-BASED DEVICE

BACKGROUND OF THE INVENTION

1. Field of the Invention

The present invention relates to a carbon nanotube-based device and a method for making such a carbon nanotube-based device.

2. Description of Related Art

Carbon nanotubes are very small tube-shaped structures having the composition of a graphite sheet rolled into a tube. Carbon nanotubes produced by arc discharge between graphite rods were first discovered and reported in an article by Sumio Iijima titled "Helical Microtubules of Graphitic Carbon" (Nature, Vol. 354, Nov. 7, 1991, pp. 56–58). Carbon nanotubes have very high electrical conductivity along a length thereof and are chemically stable, and have very small diameters (less than 100 nanometers) and large aspect ratios (length/diameter). Due to these and other properties, it has been suggested that carbon nanotubes can play an important role in fields such as microscopic electronics, materials science, biology and chemistry. Recently, a few electronic components based on a single carbon nanotube have been made in laboratories, such as a field effect transistor, a logical circuit, and a memory. For example, a transistor is reported in an article by Sander J. Tans et al. titled "Room-temperature transistor based on a single carbon nanotube" (Nature 393–49, 1998).

Although carbon nanotubes promise to have a wide range of applications, better control over their growth patterns and architectures is desired. Chemical vapor deposition has been used to grow aligned nanotubes vertically on catalyst-printed substrates. Additionally a method for controlling the growth of aligned nanotubes in several directions on a substrate at once in a single process was reported in an article by B. Q. Wei et al. titled "organized assembly of carbon nanotubes" (in Nature 416, 495–496, Apr. 4, 2002).

Another method for controlling the direction of growth of single-walled carbon nanotubes by means of electric fields was reported in an article by Yuegang Zhang et al. title "Electric-field-directed growth of aligned single-walled carbon nanotubes" (Applied Physics Letters, Vol. 79, Nov. 5, 2001).

However, carbon nanotubes of all the carbon nanotube based structures obtained by the above-mentioned methods are aligned along a linear direction, and/or extend perpendicularly from the substrates. Furthermore, the idea of using external electric-fields to direct the carbon nanotube's growth is not suitable to build complicated structures wherein the carbon nanotubes bend in several directions.

SUMMARY OF THE INVENTION

In view of the above-described limitations, an object of the present invention is to provide a carbon nanotube-based device having a carbon nanotube array extending from a substrate in an arc toward a given direction.

Another object of the present invention is to provide a method for controlling a direction of inclination or bending of a nanotube array at a localizable area.

In order to achieve the objects mentioned above, a carbon nanotube-based device comprises a substrate, a plurality of alloyed, nano-sized catalytic particles formed on the substrate, and an array of aligned carbon nanotubes extending from the alloyed nano-sized catalystic particles in an arc toward a predetermined direction. The alloyed, nano-sized catalytic particles are composed of a catalyst and catalyst-doped materials.

The method for making the carbon nanotube-based device in accordance with the present invention comprises the steps of: providing a substrate; forming a catalyst layer of uniform thickness on the substrate; depositing layers of each of two different catalyst-doped materials on different areas of the catalyst layer for accelerating or decelerating the rate of synthesis of the aligned carbon nanotube array; annealing the catalyst and the catalyst-doped materials in an oxygen-containing gas at a low temperature; introducing a carbon source gas; and forming an array of aligned carbon nanotubes extending from the alloyed, nano-sized catalytic particles using a chemical vapor deposition method.

Other objects, advantages and novel features of the present invention will become more apparent from the following detailed description and claims, and from the accompanying drawings, in which:

DETAILED DESCRIPTION OF PREFERRED EMBODIMENTS OF THE INVENTION

Figure 5:
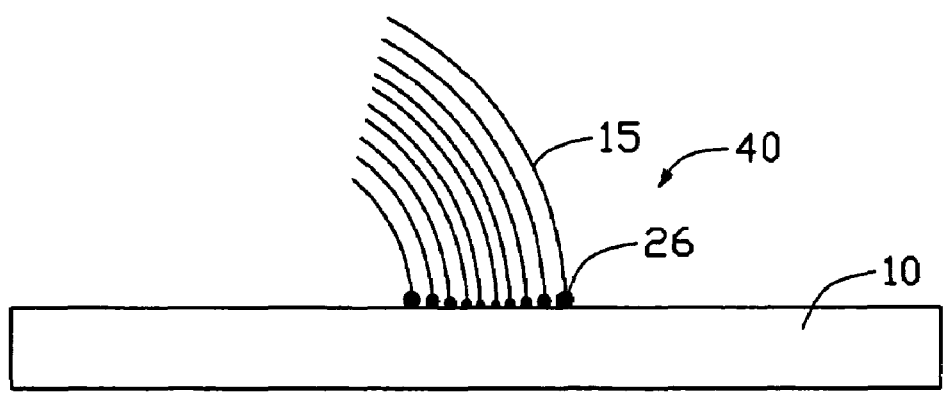
FIG. 5 is a schematic side view of aligned carbon nanotubes formed on the nano-sized particles of FIG. 4.

Referring to FIG. 5, a carbon nanotube-based device 40 in accordance with the preferred embodiment of the present invention includes a substrate 10, a number of alloyed, nano-sized catalytic particles 26 formed on the substrate 10, and an array of aligned carbon nanotubes 15 extending from the particles 26. The nanotube array 15 bends in an arc in a predetermined direction.

Referring to FIGS. 1, 3, 4, and 5, a method for making the carbon nanotube-based device 40 comprises the steps of: providing a substrate 10; forming a catalyst layer 13 having a uniform thickness on the substrate 10; depositing layers of each of two different catalyst-doped materials on different areas of the catalyst layer 13 for accelerating or decelerating a rate of synthesis of the nanotube array; annealing the catalyst layer 13 at a low temperature in an oxygen-containing gas to form nano-sized particles; introducing a carbon source gas; and forming the array of aligned carbon nanotubes 15 extending from the nano-sized catalytic particles alloyed with the catalyst-doped materials using a chemical vapor deposition method.

Reference will now be made to the drawings to describe the method in detail.

Referring to FIGS. 1–4, a preferred method for making the carbon nanotube-based device 40 of the present invention is as follows.

A substrate 10 is first provided. The substrate 10 is generally made of porous silicon, polished silicon, glass or metal. A photo-resist layer 11 is formed on the substrate 10, and a pattern thereof is defined using a photolithography method. A catalyst layer 13 having a uniform thickness is deposited on the substrate 10. Preferably, a thickness of the catalyst layer 13 is in the range from 2 nanometers to 10 nanometers.

In the preferred method, iron is selected as the material of the catalyst layer 13, and is deposited on the surface of the substrate 10 to a uniform thickness of 6 nanometers. Alternatively, material of the catalyst layer 13 can be selected from the group consisting of iron, cobalt, nickel or alloys of these. In the preferred embodiment, the catalyst layer 13 is deposited using a thermal evaporation method. Alternatively, an electron beam evaporation method in cooperation with the photolithography method can be used.

Figure 1:
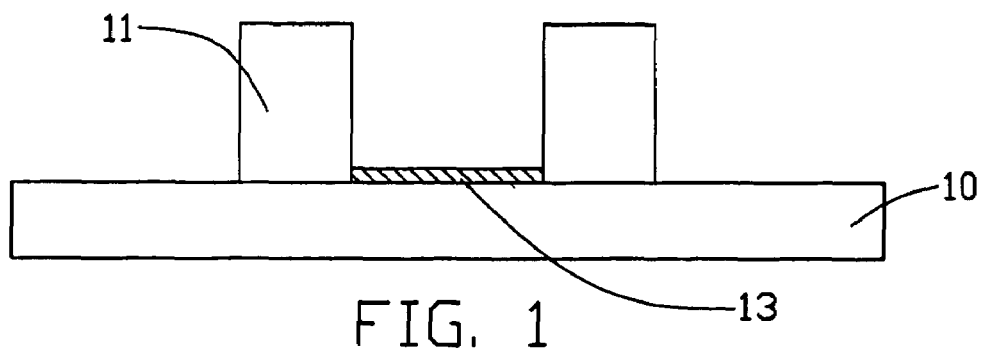
FIG. 1 is a schematic side view of a substrate with a catalyst layer deposited thereon of a preferred embodiment of the present invention.
Figure 2:
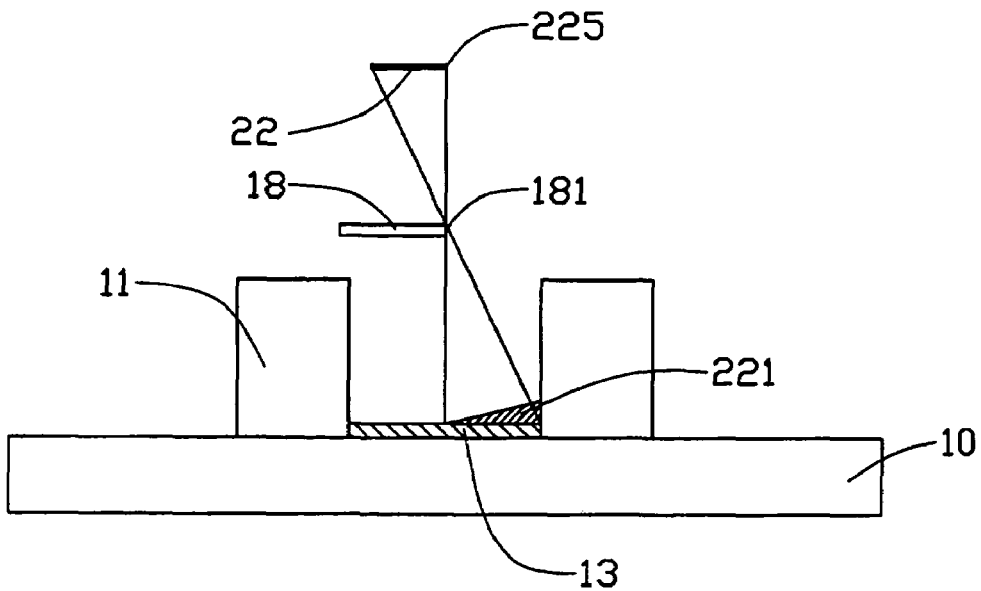
FIG. 2 is a schematic side view showing deposition of a catalyst-doped material on a first section surface of the catalyst layer.

Referring to FIG. 2, a first layer 221 of a first catalyst-doped material is deposited on a first part (not labeled) of a surface of the catalyst layer 13 using a thermal evaporation method. A mask 18 is first disposed above the catalyst layer 13 at a predetermined distance. A first linear evaporation source 22 is disposed above the mask 18. An end 181 of the mask 18 and an end 225 of the first linear evaporation source 22 terminate in a common vertical plane. The first layer 221 is deposited on the first part of the surface of the catalyst layer 13. Using this method, a thickness of the first layer 221 obtained gradually decreases along a given direction, with a thickness at one end of the first layer 221 being approximately 8 nanometers, and a thickness at an opposite end of the first layer 221 being almost zero. The first catalyst-doped material making up the first layer 221 is molybdenum, which is capable of accelerating a rate of synthesis of carbon nanotubes. A higher content of molybdenum gives rise to a faster rate of synthesis of carbon nanotubes.

Figure 3:
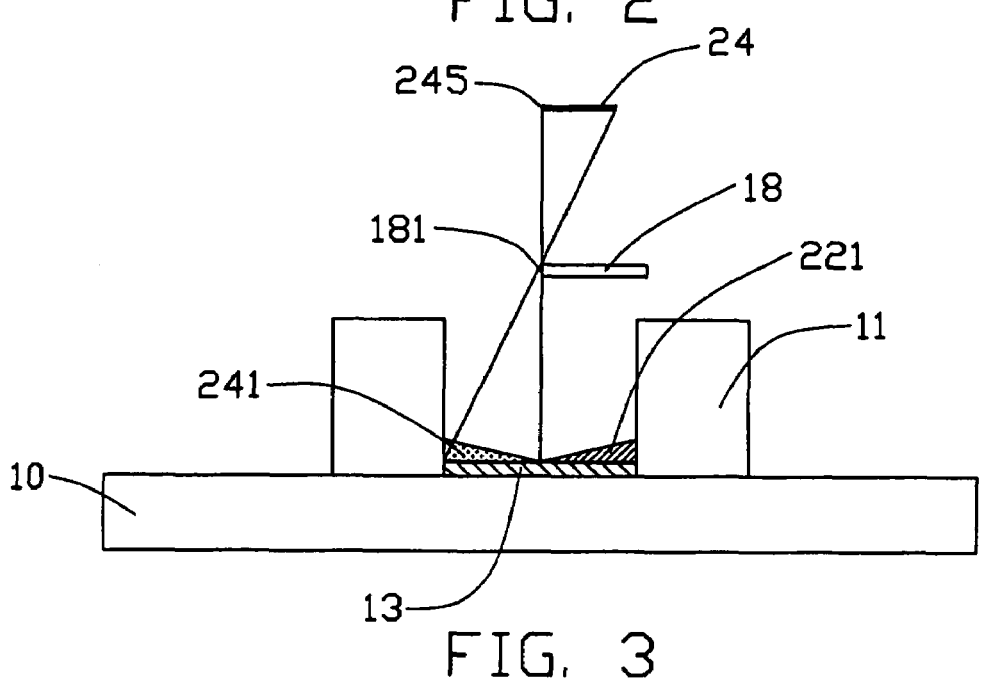
FIG. 3 is a schematic side view showing deposition of another catalyst-doped material on a second section surface of the catalyst layer.

Referring to FIG. 3, a second layer 241 of a second catalyst-doped material is deposited on an uncovered second part of the surface of the catalyst layer 13. The method of depositing the second layer 241 is the same as the first layer 221. A thickness of the second layer 241 gradually increases along the same direction, that is, the direction in which the thickness of the second layer 241 increases is the same as the direction in which the first layer 221 decreases. The thin end of the second layer 241 overlaps the thin end of the first layer 221. The second layer 241 is approximately 8 nanometers thick at its thickest, and is made of copper, which is capable of decelerating a rate of synthesis of carbon nanotubes. A higher content of copper gives rise to a slower rate of synthesis of carbon nanotubes.

Alternatively, the first and second linear evaporation sources 22, 24 may be respectively substituted with corresponding point evaporation sources that move along a pre-defined line. Further, the above-described method of depositing the two catalyst-doped material layers 221, 241 may alternatively employ other techniques, such as e-beam evaporation method.

Figure 4:
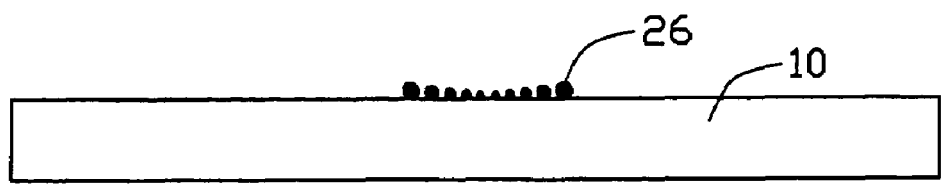
FIG. 4 is a schematic side view of the treated substrate of FIG. 3 after annealing and reducing, wherein the material on the substrate has been changed into nano-sized particles.

Referring to FIG. 4, after removing the photoresist layer 11, the substrate 10 with the catalyst layer 13 and the first and second catalyst-doped material layers 221,241 is then annealed in air at 300–400° C. During annealing, the catalyst layer 13 is oxidized and forms nano-sized catalytic particles (not shown). Thereafter, the treated substrate 10 is placed in a furnace (not shown). A mixture of carbon source gas and protective gas is then introduced into the furnace at a predetermined temperature. The carbon source gas can be acetylene, ethylene, or any suitable chemical compound which contains carbon. The protective gas can be a noble gas or nitrogen. In the preferred method, acetylene is used as the carbon source gas, and argon is used as the protective gas. The protective gas and the carbon source gas are introduced at suitable predetermined flow rates respectively. The mixture of carbon source gas and protective gas is introduced under these conditions for 5–30 minutes. During the process, the catalyst layer 13 and the first and second catalyst-doped materials are melted and form into alloyed, nano-sized catalytic particles 26, and a carbon nanotube array 15 grows from the particles 26. The thinner the portions of the first layer 221 and the second layer 241 at a location, the smaller the particles 26 formed at that location. Similarly, the thicker the portions of the first layer 221 and the second layer 241 at a location, the larger the particles 26 formed at that location. More detailed information on growth of a carbon nanotube array is taught in U.S. Pat. No. 6,232,706 entitled "Self-oriented Bundles of Carbon Nanotubes and Method of Making Same", which is incorporated herein by reference.

Referring to the FIG. 5, The copper in the particles 26 is at its highest concentration at the end corresponding to the thick end of the second layer 241. Accordingly, carbon nanotube growth at that end is slowest. By contrast, the molybdenum in the particles 26 is at its highest concentration at the end corresponding to the thick end of the first layer 221. Accordingly, carbon nanotube growth at that end is fastest. A change in the content of the particles 26 is gradual from the end corresponding to the thick end of the second layer 241 to the end corresponding to the thick end of the first layer 221. Respective speeds of the carbon nanotube growth from the particles 26 accordingly gradually increases from the end corresponding to the thick end of the second layer 241 through to the end corresponding to the thick end of the first layer 221. Due to van der Waals forces of attraction existing between the neighboring carbon nanotubes, the carbon nanotubes are bundled together. Thus the array of aligned carbon nanotubes 15 grown from the particles 26 gradually bends in an arc toward the end corresponding to the thick end of the second layer 241.

Still referring to FIG. 5, the resultant carbon nanotube-based device 40 produced by the above-described method comprises the substrate 10, the alloyed, nano-sized catalytic particles 26 formed on the substrate 10, and the array of aligned carbon nanotubes 15 extending from the nano-sized particles 26, which gradually bends in an arc toward the end of the particles 26 having the highest copper content. Note that at this time, each of the nano-sized particles 26 comprises catalyst and catalyst-doped materials, and the catalyst-doped materials content of the nano-sized particles 26 gradually changes along a given direction.

Figure 6:
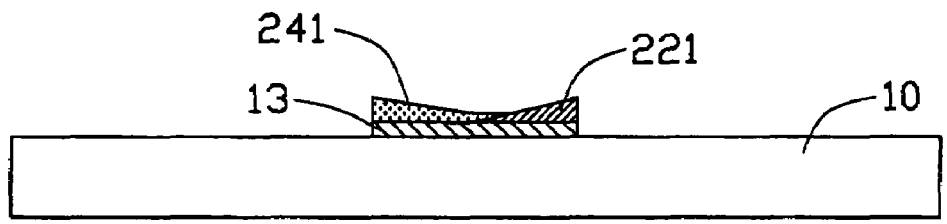
FIG. 6 is a schematic side view showing a second distribution pattern of two catalyst-doped materials deposited on the catalyst layer.

Referring to the FIG. 6, in a second embodiment of the method, the thinner end of the first layer 221 partly underlies the thinner end of the second layer 241. It is allowable for some parts of the first layer 221 and the second layer 241 to overlap; the direction of bending of the aligned carbon nanotube array will not be changed.

Figure 7:
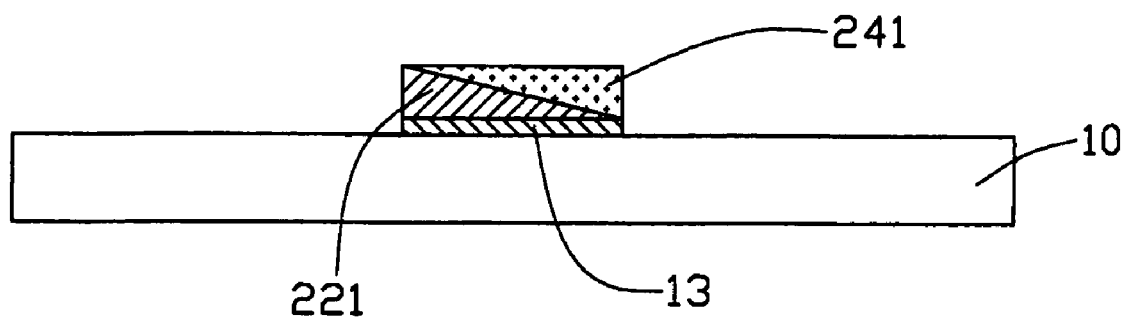
FIG. 7 is a schematic side view showing a third distribution pattern of two catalyst-doped materials deposited on the catalyst layer.

Referring to the FIG. 7, in a third embodiment of the method, the two catalyst-doped material layers 221, 241 completely overlap on the catalyst layer 13. FIG. 7 shows the first layer 221 as deposited first on the catalyst layer 13, and the second layer 241 as deposited second. The layers 221, 241 can be deposited by thermal evaporation. Alternatively, the two catalyst-doped material layers 221, 241 may be deposited at the same time. A total thickness of the catalyst-doped material layers 221, 241 and the catalyst layer 13 is essentially uniform the whole length of the catalyst layer 13.

Figure 8:
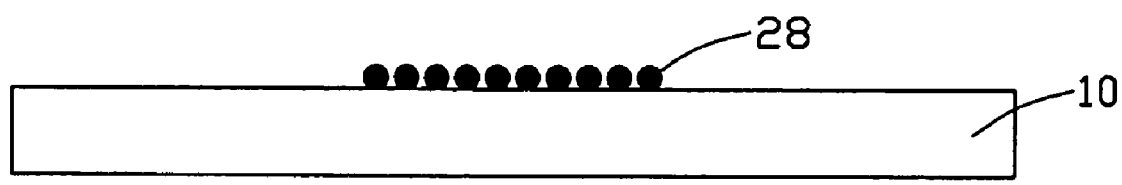
FIG. 8 is a schematic side view of the treated substrate of FIG. 7 after annealing and then reducing in furnace, wherein the material on the substrate has been changed into nano-sized particles.
Figure 9:
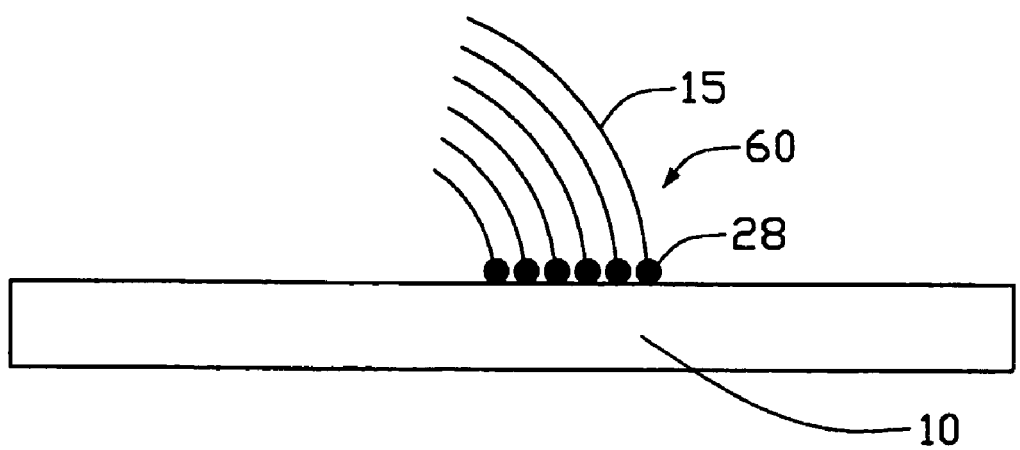
FIG. 9 is a schematic side view of aligned carbon nanotubes formed on the nano-sized particles of FIG. 8.

Referring to the FIGS. 8 and 9, in the third embodiment, the catalyst layer 13 is oxidized and changed into nano-sized catalytic particles (not shown), in similar fashion to the preferred method described above. The treated substrate 10 is then put into a furnace (not shown), and the catalyst-doped material layers 221, 241 melt, forming uniform-sized, alloyed, nano-sized catalytic particles 28. A change in the content of the particles 28 is gradual along a given direction, and respective speeds of the carbon nanotube growth from the particles 28 accordingly gradually increase or decreased along the given direction. Thus the nanotube array 15 bends in an arc toward a side of the particles 28 corresponding to a higher content of copper (i.e., toward the thick end of the second layer 241).

The carbon nanotube-base device 60 comprises the substrate 10, the alloyed, nano-sized catalytic particles 28, which have a uniform size, and the aligned carbon nanotube array 15 extending from the alloyed, nano-sized catalytic particles 28, which bends in an arc towards a predetermined direction. The alloyed, nano-sized catalytic particles 28 each contain two types of catalyst-doped materials. A catalyst-doped material content in each of the alloyed, nano-sized catalytic particles 28 gradually changes along said given direction.

Figure 10:
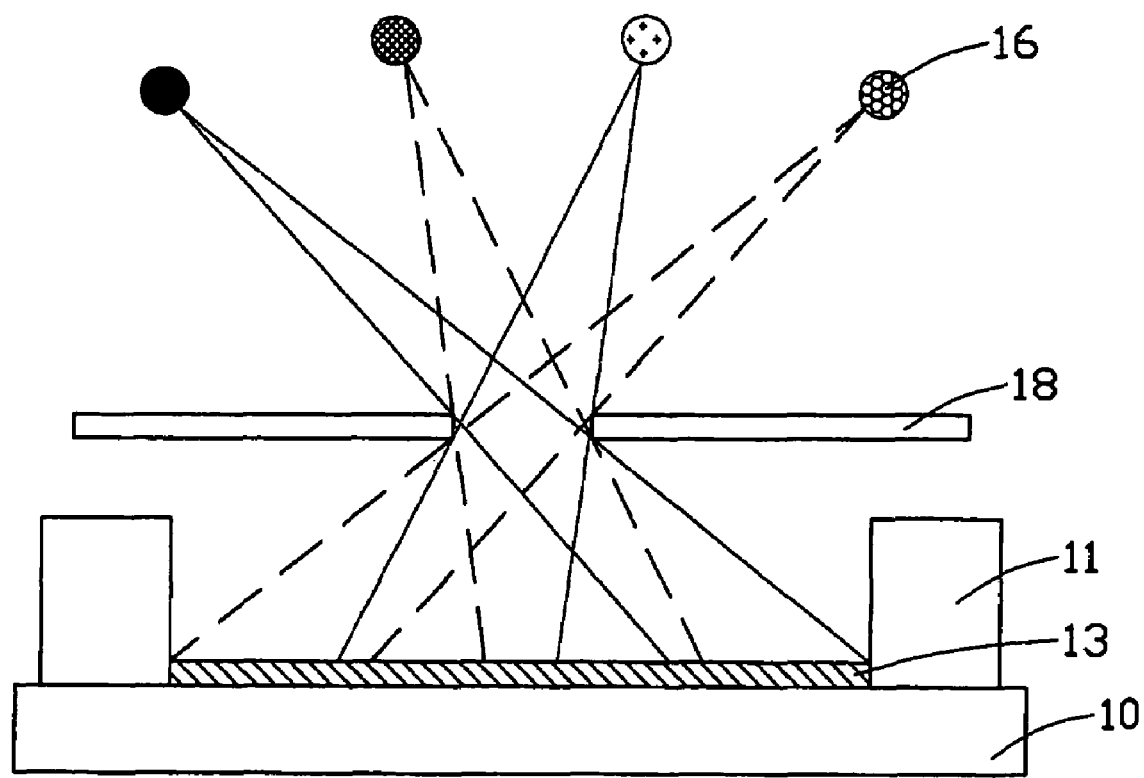
FIG. 10 is a schematic side view showing a process of depositing a number of different catalyst-doped materials by moving different point evaporation sources over the catalyst layer.

Referring to FIG. 10, a fourth embodiment of the method of the present invention is provided. Many evaporation sources 16 having different catalyst-doped materials are disposed at different positions in order to provide consecutive depositing of various catalyst-doped materials on the catalyst layer 13 by thermal evaporation. Respective speeds of carbon nanotube growth can be controlled by regulating deposition of the different catalyst-doped materials in different areas of the catalyst layer 13, so that a resulting array of aligned carbon nanotubes bends in a predetermined direction.

It will be apparent to those having ordinary skill in the field of the present invention that an order of depositing the catalyst-doped materials may be altered from that described above without effecting the reasultant annotate array 15. It will also be apparent to those having ordinary skill in the field of the present invention that if the time order rather than the position order of deposition of the catalyst and/or the catalyst-doped materials is changed, the direction of bending of the aligned carbon nanotube array 15 does not change.

It will be further apparent to those having ordinary skill in the field of the present invention that the acetylene gas may be substituted with methane, ethane or another similar hydrocarbon gas, that the argon gas may be substituted with nitrogen, helium or a similar protective gas, and that the catalyst layer 13 of iron may be substituted with cobalt, nickel, ruthenium, manganese, or a combination or alloy thereof.

The aligned carbon nanotube array 15 of the present invention can be used in fields such as planar displays, nano-electronic components, and cathode electron guns having high field current emission.

While the present invention has been described with reference to particular embodiments, the description is illustrative of the invention and is not to be construed as limiting the invention. Therefore, various modifications to the present invention can be made to the preferred embodiments by those skilled in the field without departing from the true spirit and scope of the invention as defined by the appended claims.

What is claimed is:

1. A carbon nanotube-based device comprising:
   a substrate;
   a plurality of alloyed, nano-sized catalytic particles formed on the substrate; and
   an aligned carbon nanotube array extending from the alloyed, nano-sized catalytic particles;
   wherein said alloyed, nano-sized catalytic particles each comprise a catalyst material and at least two different catalyst-doped materials which are respectively capable of causing different rates of synthesis of the carbon nanotubes; said at least two catalyst-doped materials being distributed among the nano-sized catalytic particles on the substrate in such an order and in such amounts that the rates of synthesis of the carbon nanotubes gradually change along a predetermined direction of the substrate, and said aligned carbon nanotubes array progressively bends in an arc in a predetermined direction.

2. The carbon nanotube-based device as claimed in claim 1, wherein the substrate is made of porous silicon, polished silicon, glass or metal.

3. The carbon nanotube-based device as claimed in claim 1, wherein the catalyst-doped materials comprise copper and molybdenum.

4. The carbon nanotube-based device as claimed in claim 1, wherein the catalyst is selected from the group consisting of iron, cobalt, nickel, ruthenium, manganese, and alloys thereof.

5. The carbon nanotube-based device as claimed in claim 1, wherein the amount of each of the catalyst-doped materials is distributed in gradually increasing or decreasing densities along the predetermined direction.

6. A carbon nanotube-based device comprising:
   a substrate;
   a plurality of nano-sized catalytic particles formed on the substrate; and
   an aligned carbon nanotube array extending from the nano-sized catalytic particles;
   wherein said nano-sized catalytic particles each comprise a catalyst material and at least two different catalyst-doped materials which are respectively capable of causing different rates of synthesis of the carbon nanotubes so as to adjustably define a desired direction of growth of said array.

7. The carbon nanotube-based device of claim 6, wherein the aligned carbon nanotube array arcuately extends from the nano-sized catalytic particles.

* * * * *